United States Patent Office 3,493,402
Patented Feb. 3, 1970

3,493,402
CATALYTIC DECOMPOSITION OF SILANES
Leonard M. Niebylski, Birmingham, Mich., assignor to Ethyl Corporation, New York, N.Y., a corporation of Virginia
No Drawing. Filed June 29, 1967, Ser. No. 649,804
Int. Cl. C04b 35/70, 35/56; H01b 3/02
U.S. Cl. 106—44
7 Claims

ABSTRACT OF THE DISCLOSURE

The thermal decomposition temperature of silanes is lowered by tetraalkylleads and metal oxides. For example, at temperatures between 100° and 225° C., tetraethylsilane forms silicon carbide and silicon oxide when contacted with lead oxide or lead tetraethyl.

BACKGROUND OF THE INVENTION

This invention relates to a method for promoting decomposition of silanes. Thus, it provides means for removing unwanted silanes and also means for forming silicon oxide and silicon carbide. In addition, it provides means for coating materials with silicon oxide and carbide to render them abrasive and refractory.

It has been recognized that silanes decompose thermally. Trans. of the Faraday Soc. 36, 1142-53 (1940) describes a study of the decomposition of these materials. As indicated in the article, silanes decompose at relatively high temperatures. Moreover, on page 373 of volume 12, Kirk-Othmer's Encyclopedia of Chemical Technology, Interscience Publishers (1954), it is stated that alkyl and aryl silanes are characterized by marked stability of the Si—C bond. As stated there, tetraphenylsilane can be distilled in air at 425° C. without appreciable decomposition. In contrast to these teachings in the art, this invention provides a method whereby silanes are decomposed at from about 100° C. to about 225° C.

SUMMARY OF THE INVENTION

In essence, this invention provides a low temperature method for forming silicon oxide and silicon carbide from silanes. The oxide and carbide are hard and high melting; therefore, they are useful as abrasives and protective refractory coatings.

DESCRIPTION OF PREFERRED EMBODIMENTS

Generally speaking, this invention comprises the discovery that lead alkyls and metal oxides lower the thermal decomposition of a wide variety of silanes. However, this invention is particularly directed to a certain improvement, viz., provision of a low temperature method for decomposing silanes which are stable at comparatively high temperatures. Thus, a preferred embodiment is an improved method for decomposing a stable silane; more specifically, the improvement which comprises contacting said silane and a catalyst at a temperature of from about 100° to about 225° C. and thereby decomposing said silane, said catalyst being selected from the class consisting of (a) tetraalkylleads having alkyl radicals of up to about four carbon atoms, and (b) oxides of silver, lead, tin and oxides of the metals of Groups IV-B—I-B within the first long period of the Periodic Table.

The process of this invention can be carried out in numerous ways. For example, it can be conducted by contacting the silane and catalyst in the absence of any other substance. Alternatively, the catalyst and silane can be contacted in the presence of a solvent or dispersing medium. Benzene, toluene, ethylbenzene, propylbenzene, isobutylbenzene, the xylenes, mesitylene, and durene are suitable solvents and/or dispersing media. However, any liquid material which is inert toward the silane and catalyst at the reaction temperature employed can be used.

Likewise, the process of this invention can be conducted in the presence of an oxygen-containing atmosphere as well as in an inert atmosphere (nitrogen, argon, helium, and the like). Although this process can be conducted in the presence of air, in many cases best results are obtained when a nitrogen-containing atmosphere, say at 95 percent nitrogen-5 percent oxygen, is used. Some oxygen present allows the silicon oxide product to be formed.

The temperature employed in the process, as mentioned above, is from about 100° to about 225° C.; temperatures of from 150° to 200° C. being preferred. The atmospheric pressure can be subatmospheric, ambient, or superatmospheric, say from 0.1 mm. to 2000 p.s.i. Slightly superatmospheric pressures of 20–50 p.s.i.g. yield best results in many instances, especially when it is desired to cut down the volatilization rate of a component in the reaction zone. However, because of its convenient use, ambient pressure is preferred.

The amount of catalyst employed is not critical provided that a catalytic quantity is present. In general, from 0.01 to 20 weight percent—based on the weight of silane—is employed. Preferably from 0.5 to 10 weight percent is employed, more preferably, from 1.0 to 5.0 weight percent.

From the above discussion, it should be clear to a skilled practitioner that in the process of this invention it is only necessary to contact the silane and catalyst at the reaction temperature desired. Usually the reaction is complete in one-half minute to three hours. The reaction time is not a truly independent variable but is dependent at least to some extent on other process conditions, for example, temperature and efficiency of contacting the catalyst and silane.

The lead tetraalkyls are one type of catalyst employed in this process. Although no exact limit on the number of carbons in the organic groups is known, alkylleads having alkyl groups of one to four carbons are preferred because they are more readily available. Substantially pure lead compounds can be used as well as mixtures. Suitable mixtures are physical mixtures obtained by mixing two or more) alkylleads, e.g. equimolar amounts of tetramethyllead and tetraethyllead. Mixures formed by subjecting two or more tetraalkyl compounds to the action of a redistribution catalyst are also active. A typical mixture of this type contains $Pb(CH_3)_4$, $Pb(CH_3)_3(C_2H_5)$, $Pb(CH_3)_2(C_2H_5)_2$, $Pb(CH_3)(C_2H_5)_3$, and $Pb(C_2H_5)_4$ and is obtained by redistribution of a mixture of lead tetramethyl and lead tetraethyl.

Oxides of silver, lead, tin, titanium, vanadium, chromium, manganese, iron, cobalt, nickel, and copper can be used as catalysts. Typical oxides are $Ag_2O$, $AgO$, $PbO_2$, $Pb_2O_3$, $SnO$, $TiO$, $Ti_2O_3$, $TiO_2$, $VO$, $VO_2$, $V_2O_3$, $V_2O_5$, $CrO$, $Cr_2O_3$, $CrO_2$, $MnO$, $MnO_2$, $Mn_2O_3$, $FeO$, $Fe_2O_3$, $Fe_3O_4$, $NiO$, $Ni_2O_3$, $CoO$, $Co_3O_4$, $CuO$, and $Cu_2O$.

The following examples serve to illustrate the invention but not limit it. All parts are by weight.

Example I

A reaction chamber containing an air-nitrogen atmosphere was used. In the chamber was placed a reaction vessel containing a reaction mixture of five volumes of tetraethyl silane, one volume of tetraethyllead and ten volumes of benzene. The vessel was in a silicone oil bath and means to heat the bath were provided. In the reaction chamber and one and one-half inches above the reaction vessel was placed a stainless steel plate heated by a Nichrome coil.

Vapors were produced by heating the reaction mixture until 225° C. was reached. The vapors were allowed to impinge on the steel plate which was heated to 225° C. A dark grey protective coat, 50–60 percent SiC, 30–40 percent $SiO_2$, and 10 percent unknown was produced.

When this process was carried out in essentially the same manner except that a catalyst was not employed, a similar coat was not produced until the steel plate was heated to 750° C.

Example II

A solution of tetraethyl silane in benzene, comparable concentration as used in Example I was passed through a bed of $PbO_2$ at 100° C. under air-nitrogen. The silane almost completely decomposed to SiC and $SiO_2$. Much higher temperatures are required in the absence of the catalyst.

Example III

A solution of tetraethyl silane in benzene similar to that used in Examples I and II was admixed with two weight percent tetraethyllead. Heating the mixture to 150° C. caused the formation of SiC and $SiO_2$.

Examples IV–IX

A metal oxide, 0.1 g. was mixed with 10 cc. of tetraethyl silane and 10 cc. of benzene. The mixture was placed in a suitable reaction vessel and heated for 20–30 minutes under an air-nitrogen atmosphere at 100–150° C. Results, oxides, and specific temperatures are tabulated below.

| | Catalyst | Temperature, (° C.) | Product |
|---|---|---|---|
| IV | $PbO_2$ | 100 | PbO trace $+SiC+SiO_2$ |
| V | PbO (red) | 125 | $PbO+SiO_2+SiC$ |
| VI | $Pb_2O_3$ | 135 | $Pb_2O_3+SiO_2+SiC$ |
| VII | SnO | 125 | $SnO+SnO_2+SiO_2+SiC$ |
| VIII | $Ag_2O_2$ | 150 | $AgO_2+SiO_2+SiC$ |
| IX | $MnO_2$ | 150 | $MnO_2+SiC+SiO_2$ |

Similar results were obtained using tetramethyl silane.

When tetraphenyl silane is treated in a similar manner with $TiO_2$, CrO, $Cr_2O_3$, MnO, $Mn_2O_3$, FeO, $Fe_2O_3$, $Fe_3O_4$, NiO, $Ni_2O_2$, CuO, and $Cu_2O$, the silane decomposes to silicon carbide and silicon oxide.

This invention can be extended to the use of organo-lead alkanoates and lead salts of organic acids as catalysts.

Silicon oxide and silicon carbide are old compounds and the oxide and carbide produced by the process of this invention have the many uses known therefor. More particularly, the films, coatings, and particulates generated by the process of the invention consist to a great extent in small size grains of high mechanical strength and chemical and thermal stability. They also have high dielectric character. Therefore, they are especially applicable in producing protective and insulating coatings for electronic solid state components and optical products.

I claim:

1. In a process for thermally decomposing a silane having the formula $R_4Si$ wherein R is selected from methyl, ethyl, and phenyl, the improvement which comprises contacting said silane and a catalyst at a temperature of from about 100° to about 225° C. and thereby decomposing said silane, said catalyst being selected from the class consisting of (a) tetraalkylleads having alkyl radicals of up to about four carbon atoms, and (b) oxides of silver, lead, tin, and oxides of the metals of Groups IV-B—I-B within the first long period of the Periodic Table.

2. The process of claim 1 wherein said silane is tetraethylsilane.

3. The process of claim 2 wherein said catalyst is tetraethyllead.

4. The process of claim 2 wherein said catalyst is lead sesquioxide.

5. The process of claim 2 wherein said catalyst is lead dioxide.

6. The process of claim 2 wherein said catalyst is manganous oxide.

7. The process of claim 2 wherein said catalyst is nickel oxide.

References Cited

Bazant, V., et al., Organosilicon Compounds, New York (Academic Press), 1965, pp. 234, 235.

JAMES E. POER, Primary Examiner

W. R. SATTERFIELD, Assistant Examiner

U.S. Cl. X.R.

23—208; 106—56, 69; 252—431, 461, 471, 476